US008297143B2

(12) United States Patent
Fujii et al.

(10) Patent No.: US 8,297,143 B2
(45) Date of Patent: Oct. 30, 2012

(54) ELECTRICAL BICYCLE SHIFT CONTROL DEVICE

(75) Inventors: Kazuhiro Fujii, Kawachinagano (JP); Akinobu Uno, Takarazuka (JP)

(73) Assignee: Shimano Inc., Osaka (JP)

( * ) Notice: Subject to any disclaimer, the term of this patent is extended or adjusted under 35 U.S.C. 154(b) by 741 days.

(21) Appl. No.: 12/468,381

(22) Filed: May 19, 2009

(65) Prior Publication Data

US 2010/0294068 A1 Nov. 25, 2010

(51) Int. Cl.
*B62M 25/08* (2006.01)

(52) U.S. Cl. ............... 74/473.13; 74/473.12; 74/473.33; 74/524; 200/61.88; 280/261

(58) Field of Classification Search ............... 74/473.13, 74/491, 504, 507, 469, 473.12, 473.33, 524; 192/217; 200/61.88; 280/260, 261
See application file for complete search history.

(56) References Cited

U.S. PATENT DOCUMENTS

| | | | |
|---|---|---|---|
| 4,055,093 A | 10/1977 | Ross | |
| 4,143,557 A | 3/1979 | Wakebe et al. | |
| 4,900,291 A | 2/1990 | Patterson | |
| 5,358,451 A | 10/1994 | Lacombe et al. | |
| 5,400,675 A | 3/1995 | Nagano | |
| 5,470,277 A | 11/1995 | Romano | |
| 5,653,649 A | 8/1997 | Watarai | |
| 5,678,455 A | 10/1997 | Watarai | |
| 5,768,945 A | 6/1998 | Ose | |
| 5,941,125 A | 8/1999 | Watarai et al. | |
| 6,015,036 A | 1/2000 | Fukuda | |
| 6,038,923 A | 3/2000 | Lin | |
| 6,073,730 A | 6/2000 | Abe | |
| 6,129,580 A | 10/2000 | Kishimoto | |
| 6,216,078 B1 | 4/2001 | Jinbo et al. | |
| 6,227,068 B1 | 5/2001 | Masui et al. | |
| 6,276,230 B1 | 8/2001 | Crum et al. | |
| 6,546,827 B2 | 4/2003 | Irie | |
| 6,698,307 B2 | 3/2004 | Wesling et al. | |
| 6,698,567 B2 * | 3/2004 | Dal Pra' | ........................ 192/217 |

(Continued)

FOREIGN PATENT DOCUMENTS

DE 29507555 U1 8/1995

(Continued)

OTHER PUBLICATIONS

European Search Report of corresponding EP Application No. 09 17 0888.3 dated Aug. 9, 2010.

(Continued)

*Primary Examiner* — William C Joyce
(74) *Attorney, Agent, or Firm* — Global IP Counselors, LLP (57) ABSTRACT

An electrical bicycle shift control device is provided with a base member, a first shift operating member and a second shift operating member. The handlebar mounting portion is configured to be fixedly mounted to a free end of a bicycle handlebar. The base member includes a handlebar mounting portion that is configured to be fixedly mounted a handlebar. The first shift operating member is pivotally coupled the base member from a rest position to a shift position in a first shift operating direction. The second shift operating member is mounted on the first shift operating member to move with the first shift operating member with respect to the base member. The second shift operating member is independently movable relative the first shift operating member from a rest position to a shift position in a second shift operating direction that is different to the first shift operating direction.

14 Claims, 10 Drawing Sheets

U.S. PATENT DOCUMENTS

| | | |
|---|---|---|
| 6,734,376 B2 | 5/2004 | Ichida et al. |
| 7,350,436 B2 | 4/2008 | Fujii |
| 2001/0053724 A1 | 12/2001 | Campagnolo |
| 2003/0019712 A1 | 1/2003 | Dal Pra' |
| 2003/0074997 A1 | 4/2003 | Wesling et al. |
| 2005/0016312 A1 | 1/2005 | Dal Pra' |
| 2005/0109577 A1 | 5/2005 | Uno et al. |
| 2005/0211014 A1 | 9/2005 | Fujii |
| 2005/0223840 A1 | 10/2005 | Takamoto |
| 2006/0162477 A1 | 7/2006 | Campagnolo |
| 2009/0114051 A1 | 5/2009 | Miki |

FOREIGN PATENT DOCUMENTS

| | | |
|---|---|---|
| DE | 19642906 A1 | 4/1997 |
| DE | 10055922 A1 | 5/2002 |
| EP | 1225123 A1 | 7/2002 |
| EP | 1375325 A2 | 1/2004 |
| EP | 1473220 A1 | 11/2004 |
| EP | 1535829 A2 | 6/2005 |
| EP | 1535830 A2 | 6/2005 |
| EP | 1582452 A2 | 10/2005 |
| EP | 1588933 A2 | 10/2005 |
| EP | 1698546 A2 | 9/2006 |
| EP | 1808367 A2 | 10/2006 |
| EP | 2 022 711 A2 | 2/2009 |
| EP | 2 058 219 A2 | 5/2009 |
| EP | 2 078 667 A1 | 7/2009 |
| FR | 2654698 A1 | 5/1991 |
| JP | 60-85297 U | 6/1985 |
| JP | 05-286476 A | 11/1993 |
| JP | 08-26174 A | 1/1996 |
| JP | 2003-341376 A | 12/2003 |
| TW | 200920650 A | 5/2009 |
| WO | WO-2006/091197 A2 | 8/2006 |

OTHER PUBLICATIONS

Taiwanese Office Action of corresponding Taiwanese Application No. 098130579 dated Dec. 23, 2011.

* cited by examiner

ELECTRICAL BICYCLE SHIFT CONTROL DEVICE

BACKGROUND OF THE INVENTION

1. Field of the Invention

This invention generally relates to a bicycle control device for performing a shifting operation. More specifically, the present invention relates to a electric bar end shifter which is configured to be mounted to a free end of a bicycle handlebar in an integrated manner.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for shifting and braking.

In the case of a time trial bicycle, a bull horn handlebar is often used that curve forward away from the rider that allows the rider to ride in a tuck position. The bull horn handlebar is sometimes provided with a pair of aero bars or a single loop shaped aero bar. The aero bar attaches to the main bar near the stem and provides a position where the hands and fore-arms are close together, low and forward, providing a very aerodynamic (though less stable) position. Typically, each end of the bull horn handlebar is provided with a "handlebar-end shifter" or "bar-end shifter". These bar-end shifters can include a brake lever in some instances. Recently, bar-end shifters have been added to the free ends of aero bars of the cantilevered type.

In the past, bar-end shifters were mechanically operated devices that were sometimes located near the brake levers of the bicycle. Thus, an operating force was typically applied by one of the rider's fingers to operate a shift control lever, which in turn transmitted the operating force to the drive component of a bicycle shifting mechanism by a cable that was fixed at one end to the control lever. More recently, electric switches have been used instead of mechanical control levers in order to operate the bicycle shifting mechanism. One example of an electrical shift control device is disclosed in U.S. Pat. No. 5,358,451. This patent discloses a plurality of electric switches may be provided at a plurality of handlebar locations in order to allow for quicker shifts and to enhance responsiveness. Another example of a bicycle electrical shift control device is disclosed in U.S. Patent Application Publication No. 2005/0211014.

SUMMARY OF THE INVENTION

One object of the present invention is to provide an electric bar end shifter having two electrical shift switches that can be easily operated.

The foregoing object can basically be attained by providing an electrical bicycle shift control device comprising a base member, a first shift operating member and a second shift operating member. The handlebar mounting portion is configured to be fixedly mounted to a free end of a bicycle handlebar. The base member includes a handlebar mounting portion that is configured to be fixedly mounted a handlebar. The first shift operating member is pivotally coupled the base member from a rest position to a shift position in a first shift operating direction. The second shift operating member is mounted on the first shift operating member to move with the first shift operating member with respect to the base member. The second shift operating member is independently movable relative the first shift operating member from a rest position to a shift position in a second shift operating direction that is different to the first shift operating direction.

This and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
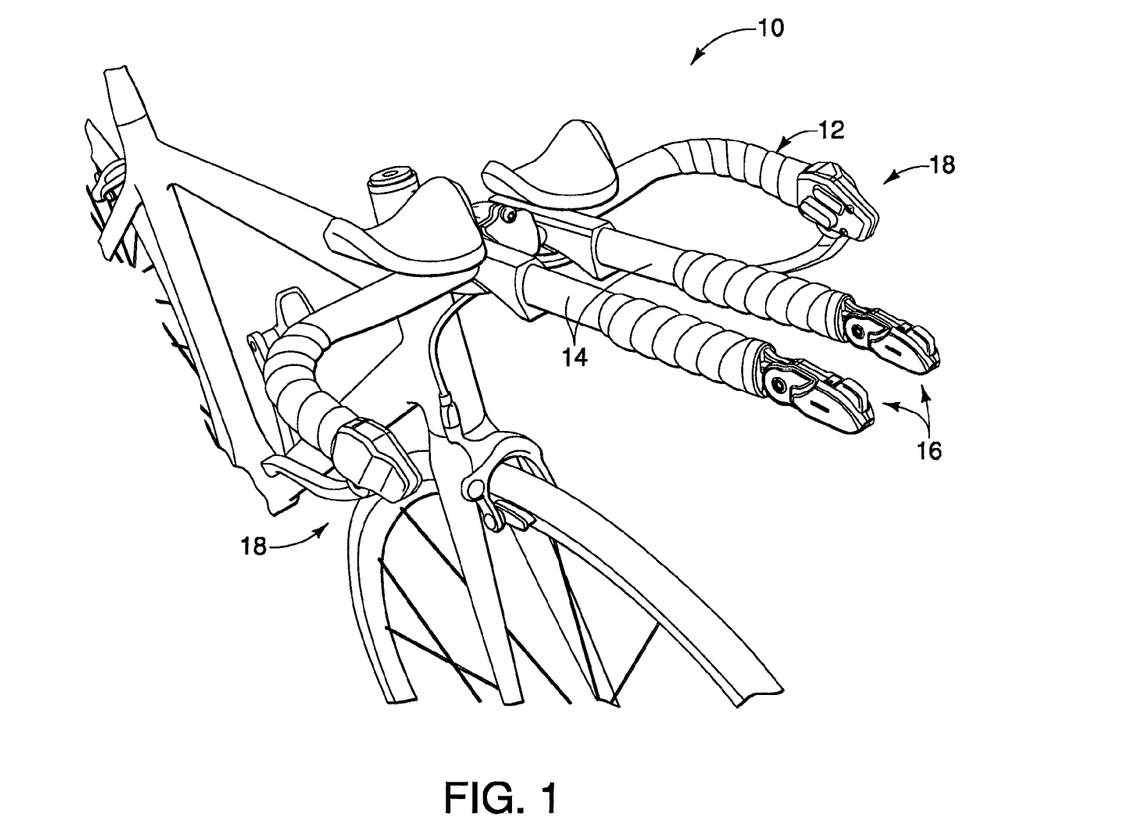
FIG. 1 is a partial front perspective view of a bicycle equipped a pair of aero bars with a pair of middle electric bar end shifters (shift control devices) mounted to the free ends of the aero bars in accordance with a first embodiment.

Referring initially to FIG. 1, a time trial bicycle 10 is illustrated with a bull horn handlebar 12 and a pair of aero bars 14 with a pair of middle electric bar end shifters 16 in accordance with a first embodiment. The bar end shifters 16 are mounted to the free ends of the aero bars 14. The bar end shifters 16 constitute electrical bicycle shift control devices as discussed below. The aero bars 14 constitute cantilevered handlebars as discussed below. The bull horn handlebar 12 is also provided with a pair of main electric bar end shifter 18 coupled to free ends of the bull horn handlebar 12.

Figure 2:
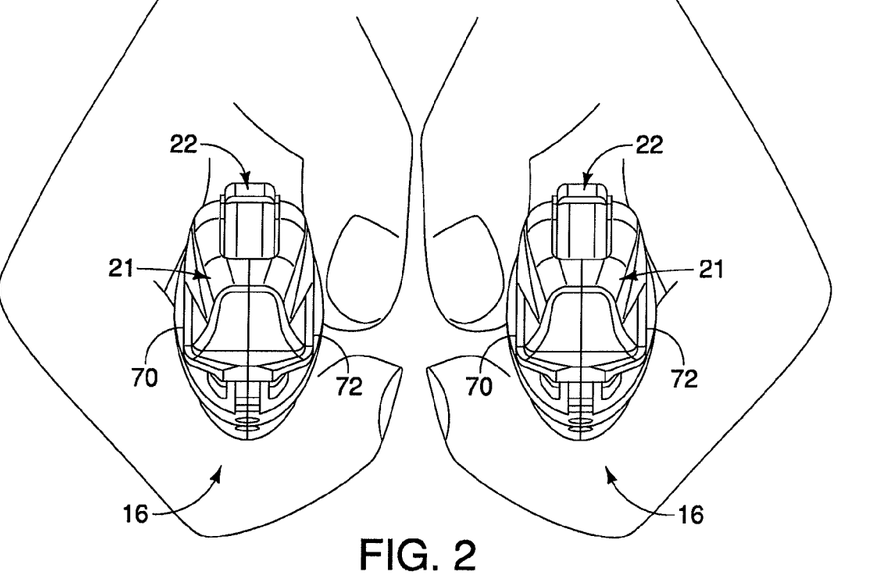
FIG. 2 is a front elevational view of the bar end shifters, with a rider gripping the aero bars.
Figure 3:
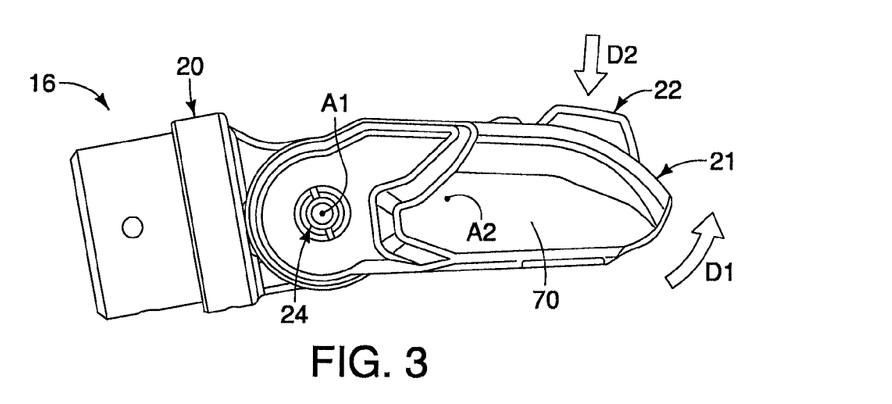
FIG. 3 is a side elevational view of the right bar end shifter illustrated in FIGS. 1 and 2, prior to attachment to the free end of the right side aero bar.
Figure 4:
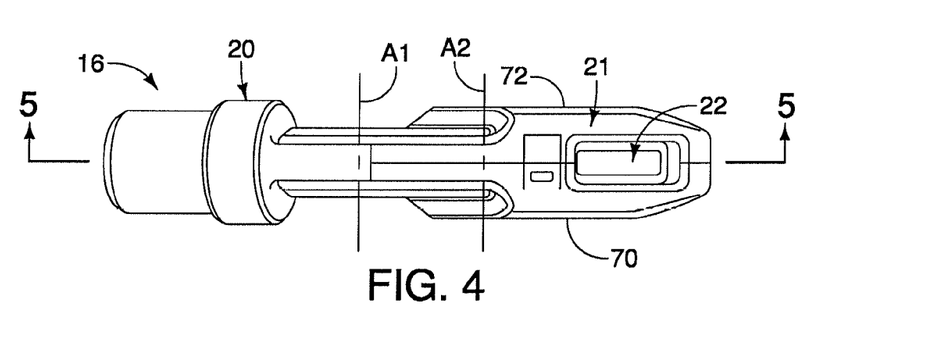
FIG. 4 is a top plan view of the right bar end shifter illustrated in FIGS. 1 to 3, prior to attachment to the free end of the right side aero bar.

As seen in FIGS. 2 and 3, the bar end shifters 16 are configured to be operated in a generally vertical plane (shift operating directions D1 and D2) such that the bar end shifters 16 can be position closely together to reduce air resistance. In other words, since the operating directions of the bar end shifters 16 are not operated in a horizontal direction with respect to the bicycle 10, the rider does not need to move his/her hands or fingers in a sideways direction (horizontal plane) to operate the bar end shifters 16. Thus, no additional space is needed between the bar end shifters 16 for operating them.

Basically, each of the bar end shifters 16 is provided with a base member 20, a first shift operating member 21 and a second shift operating member 22. In this illustrated embodiment, the bar end shifters 16 are identical in construction. However, one of the bar end shifters 16 is operatively (electrically) coupled to a rear derailleur (not shown), while the other of the bar end shifters 16 is operatively (electrically) coupled to a front derailleur (not shown). Since derailleurs as well as other conventional bicycle parts of the bicycle 10 are well known in the bicycle art, the derailleurs and the other bicycle parts of the bicycle 10 will not be discussed or illustrated in detail herein, except for the parts relating to the present invention. Moreover, various conventional bicycle parts, which are not illustrated and/or discussed in detail herein, can also be used in conjunction with the bar end shifters 16.

The first shift operating member 21 is pivotally coupled the base member 20 by a pivot pin 24. In this illustrated embodiment, the pivot pin 24 is formed by a bolt 24a and a nut 24b. The pivot pin 24 defines a first pivot axis A1 in which the first shift operating member 21 pivots about the first pivot axis A1 with respect to the base member 20. The second shift operating member 22 is mounted on the first shift operating member 21 to move with the first shift operating member 21 with respect to the base member 20 about the first pivot axis A1 when the first shift operating member 21 is pivoted from a rest position (FIG. 5) to a shift or operating position (FIG. 6) in the first shift operating direction D1 as explained below. The second shift operating member 22 is also independently movable relative the first shift operating member 21 about a second pivot axis A2 from a rest position (FIG. 5) to a shift or operating position (FIG. 7) in the second shift operating direction D2, which is different to the first shift operating direction D1. In this illustrated embodiment, the first and second pivot axes A1 and A2 are different axes that are parallel (as shown) or substantially parallel (i.e., within five degrees of parallel) to each other. Also in this illustrated embodiment, the second shift operating direction D2 of the second shift operating member 22 is substantially opposite to the first shift operating direction D1. Since the first and second shift operating members 21 and 22 each move in only one shift operating direction, which is different from the other shift operating direction, the rider is less likely to mistakenly operate the wrong one of the first and second shift operating members 21 and 22. The second shift operating member 22 is not limited to pivotally movement.

An electrical shift control unit 26 is mounted with the first shift operating member 21. Basically, the first shift operating member 21 supports the electrical shift control unit 26 such that the electrical shift control unit 26 moves (pivots) with the first shift operating member 21 with respect to the base member 20 about the first pivot axis A1 when the first shift operating member 21 is pivoted from a rest position (FIG. 5) to a shift position (FIG. 6) in the first shift operating direction D1 as explained below. The electrical shift control unit 26 is electrically coupled to an electric derailleur or some other type of gear shifting device by an electrical cord 28 having one or more electrical conductors.

As seen in FIGS. 5 to 9, the electrical shift control unit 26 is a waterproof electrical switch unit that basically includes an electrical switch housing 30, a first electrical switch 31, a second electrical switch 32 and a single circuit board 33. The electrical switch housing 30 is supported on the first shift operating member 21. Thus, the first and second electrical switches 31 and 32 are disposed on the first shift operating member 21 for movement with the first shift operating member 21 relative to the base member 20. The first and second electrical switches 31 and 32 are formed on the single circuit board 33 that is disposed within the electrical switch housing 30

One of the first and second electrical switches 31 and 32 outputs a first shift (control) signal such as a downshift signal, while the other of the first and second electrical switches 31 and 32 outputs a second shift (control) signal such as an upshift signal. Accordingly, the electrical shift control unit 26 (i.e., electrical switches 31 and 32) can be utilized for both upshifting and downshifting one of the derailleurs. The first electrical switch 31 is operated by the first shift operating member 21, and outputs the first shift (control) signal when the first shift operating member 21 is pivoted from the rest position (FIG. 5) to the shift position (FIG. 6) in the first shift operating direction D1. The second electrical switch 32 is operated by the second shift operating member 22, and outputs the second shift (control) signal when the second shift operating member 22 is pivoted from the rest position (FIG. 5) to the shift position (FIG. 7) in the second shift operating direction D2. The first shift operating member 21 is an upshift member that is rotated upwardly to upshift towards a higher gear, while the second shift operating member 22 is a downshift member that is depressed downwardly to downshift towards a lower gear. Of course, it will be apparent to those skilled in the art from this disclosure that the upshifting and downshifting operations of the first and second shift operating members 21 and 22 could be reversed, if needed and/or desired, depending on how the electrical conductors of the electrical cord 28 are connected to the derailleur.

In the illustrated embodiment, the first and second electrical switches 31 and 32 are normally open pushbutton switches. Preferably, the first electrical switch 31 has a first button 31*a* that is operated (depressed) by the first shift operating member 21 when the first shift operating member 21 is pivoted from the rest position (FIG. 5) to the shift position (FIG. 6) in the first shift operating direction D1. Similarly, the second electrical switch 32 has a second button 32*a* that is operated (depressed) by the second shift operating member 22 when the second shift operating member 22 is pivoted from the rest position (FIG. 5) to the shift position (FIG. 7) in the second shift operating direction D2. Each of the first and second electrical switches 31 and 32 has an internal spring mechanism (not shown) that returns the button 31*a* or 32*a* to its "out" or "unpressed" position once the shift operating member 21 or 22 is released. The first and second electrical switches 31 and 32 are well known and thus, the details of the first and second electrical switches 31 and 32 will not be illustrated and/or described in greater detail herein.

Preferably, a shift operation indicating mechanism 40 is installed in the base member 20 for indicating when the first shift operating member 21 has been pivoted from the rest position (FIG. 5) to the shift position (FIG. 6) in the first shift operating direction D1. In this embodiment, the shift operation indicating mechanism 40 provides both a clicking noise and a haptic signal to the rider when the first shift operating member 21 has been pivoted from the rest position (FIG. 5) to the shift position (FIG. 6).

Figure 5:
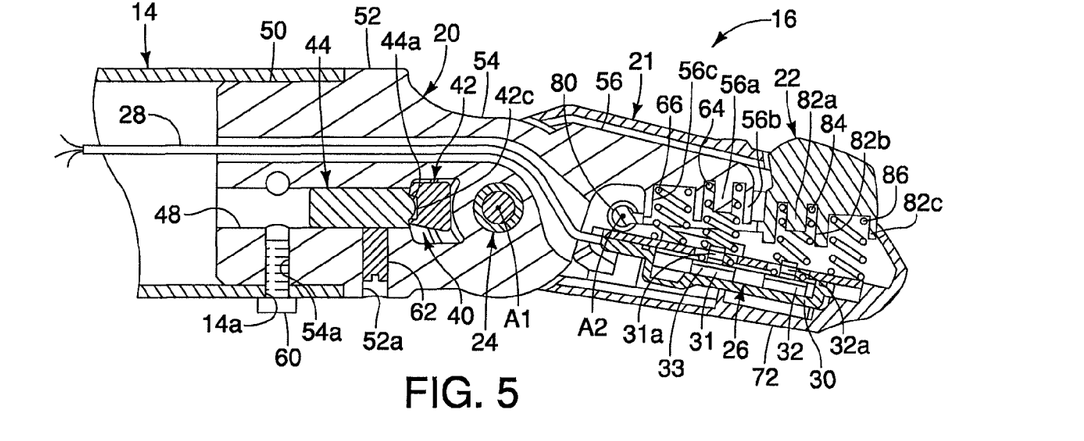
FIG. 5 is a cross-sectional view of the right bar end shifter as seen along section line 5-5 of FIG. 4, but with the right bar end shifter attached to the free end of the right side aero bar and the first and second shift operating members in rest positions.
Figure 6:
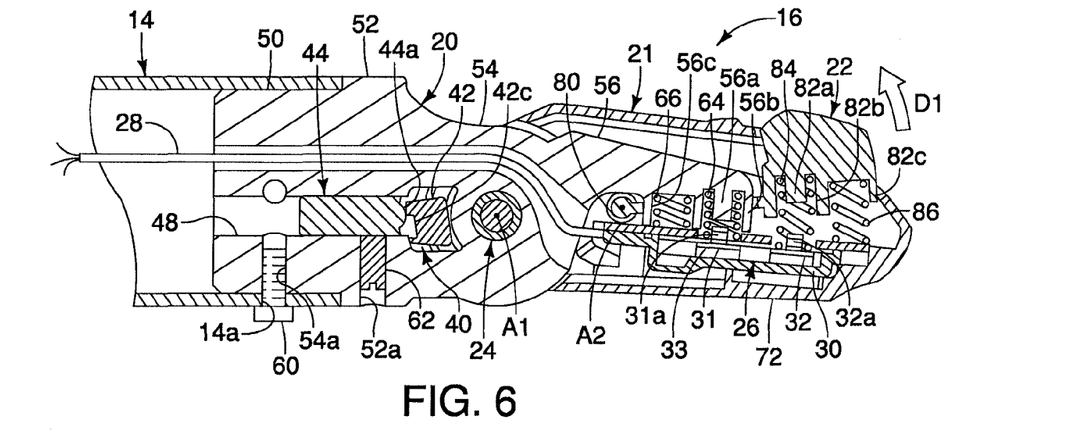
FIG. 6 is a cross-sectional view, similar to FIG. 5, of the right bar end shifter attached to the free end of the right side aero bar with the first shift operating member in the shift position and the second shift operating member in the rest position.
Figure 7:
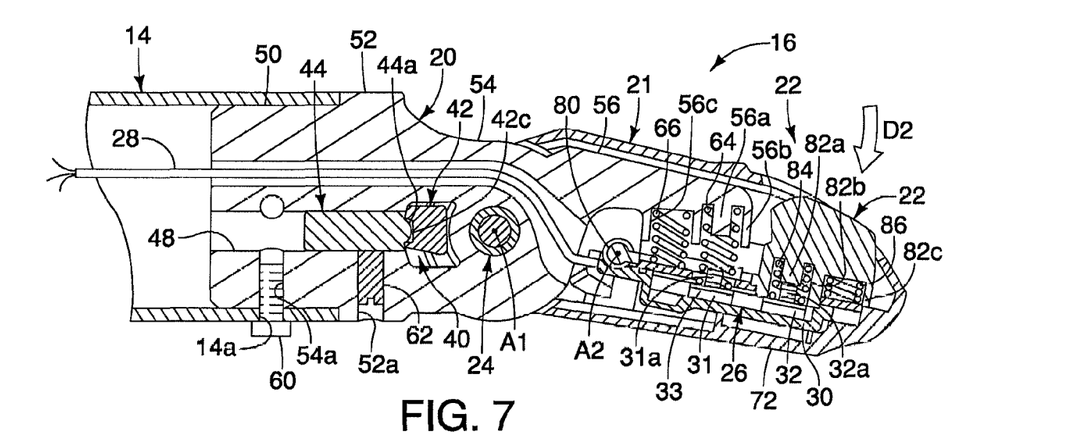
FIG. 7 is a cross-sectional view, similar to FIG. 5, of the right bar end shifter attached to the free end of the right side aero bar with the first shift operating member in the rest position and the second shift operating member in the shift position.
Figure 8:
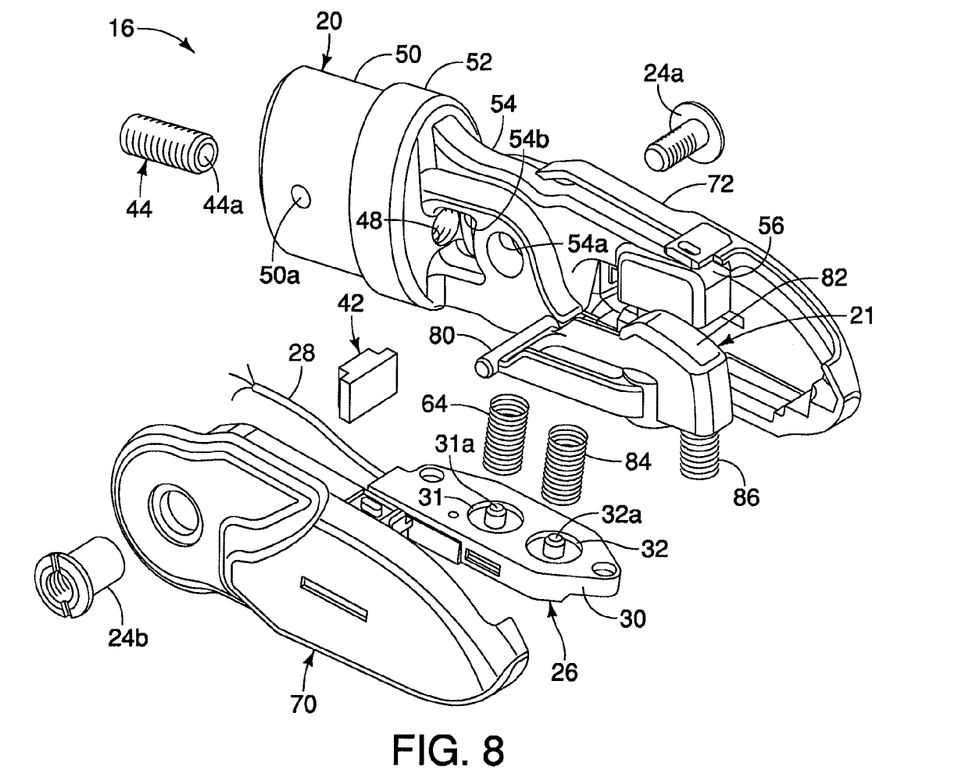
FIG. 8 is an exploded perspective view of the right bar end shifter illustrated in FIGS. 1 to 7 with the cover exploded outwardly to reveal the internal shifting components.
Figure 9:
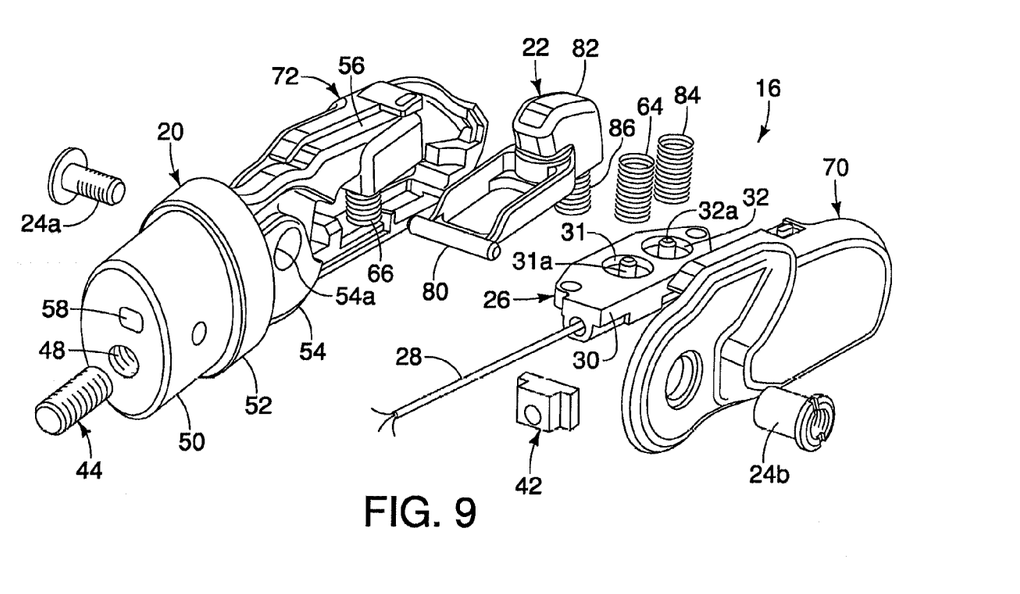
FIG. 9 is another exploded perspective view of the right bar end shifter illustrated in FIGS. 1 to 8 with the cover exploded outwardly to reveal the internal shifting components.
Figure 10:
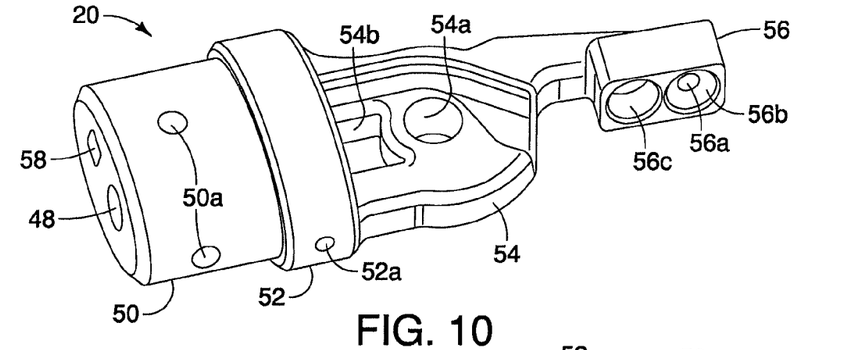
FIG. 10 is a perspective view of the base member of the right bar end shifter illustrated in FIGS. 1 to 9.
Figure 11:
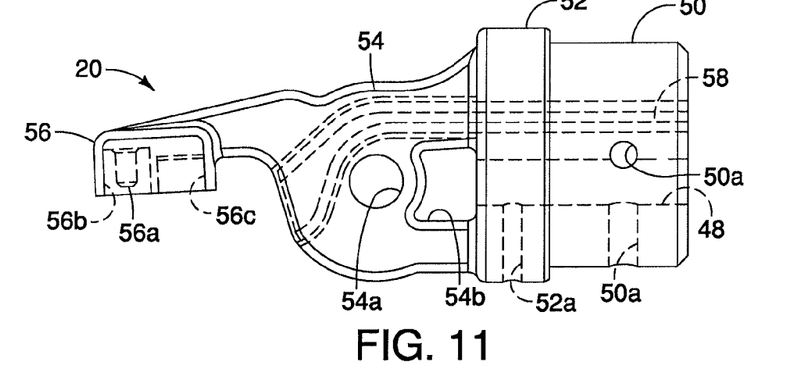
FIG. 11 is a side elevational view of the base member illustrated in FIG. 10 for the right bar end shifter illustrated in FIGS. 1 to 9.
Figure 12:
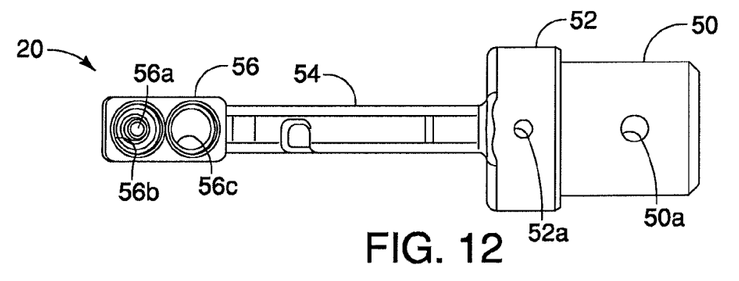
FIG. 12 is a bottom plan view of the base member illustrated in FIGS. 10 and 11 for the right bar end shifter illustrated in FIGS. 1 to 9.
Figure 13:
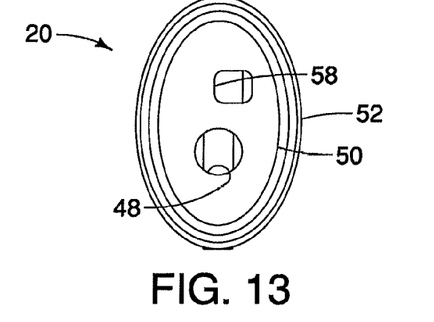
FIG. 13 is a rear end elevational view of the base member illustrated in FIGS. 10 to 12 for the right bar end shifter illustrated in FIGS. 1 to 9.
Figure 14:
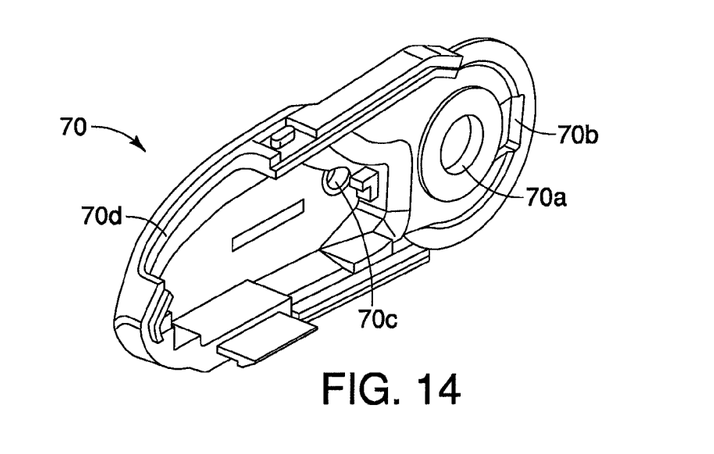
FIG. 14 is a perspective view of the first lever body part of the first shift operating member for the right bar end shifter illustrated in FIGS. 1 to 9.
Figure 15:
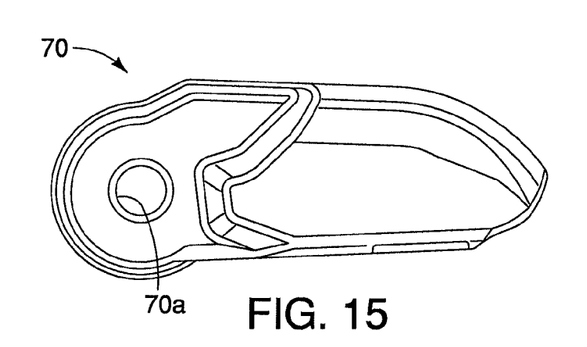
FIG. 15 is an outside elevational view of the first lever body part of the first shift operating member illustrated in FIG. 14 for the right bar end shifter illustrated in FIGS. 1 to 9.
Figure 16:
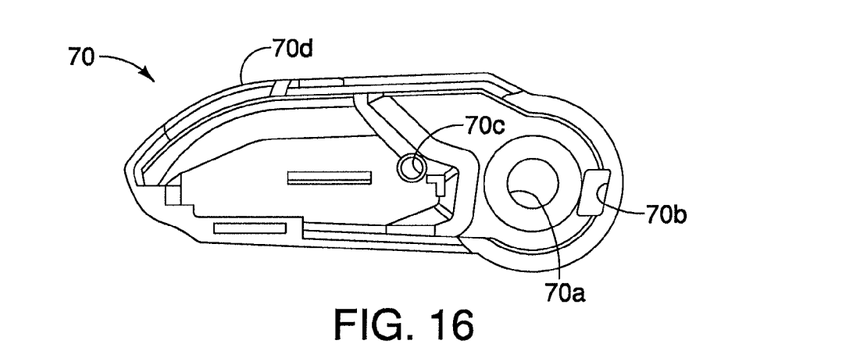
FIG. 16 is an inside elevational view of the first lever body part of the first shift operating member illustrated in FIGS. 14 and 15 for the right bar end shifter illustrated in FIGS. 1 to 9.
Figure 17:
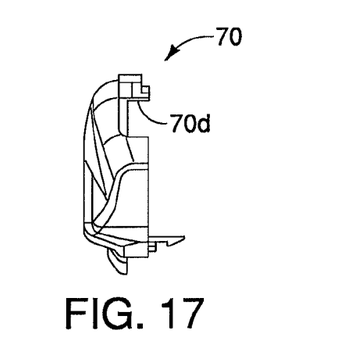
FIG. 17 is a front end elevational view of the first lever body part of the first shift operating member illustrated in FIGS. 14 to 16 for the right bar end shifter illustrated in FIGS. 1 to 9.
Figure 18:
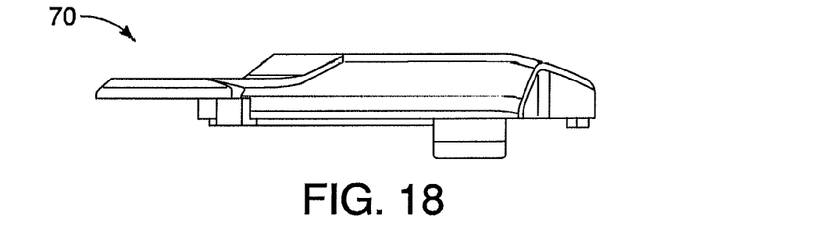
FIG. 18 is a bottom plan view of the first lever body part of the first shift operating member illustrated in FIGS. 14 to 17 for the right bar end shifter illustrated in FIGS. 1 to 9.
Figure 19:
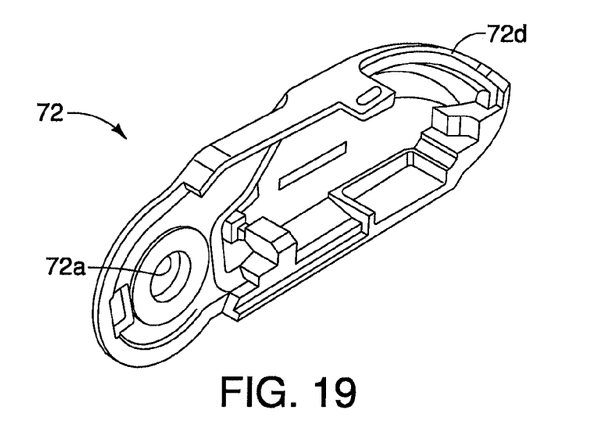
FIG. 19 is a perspective view of the second lever body part of the first shift operating member for the right bar end shifter illustrated in FIGS. 1 to 9.
Figure 20:
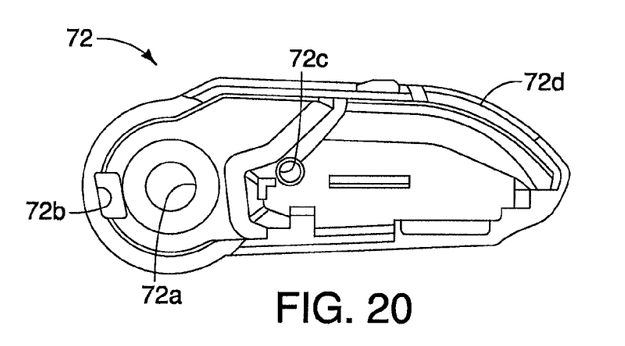
FIG. 20 is an outside elevational view of the second lever body part of the first shift operating member illustrated in FIG. 19 for the right bar end shifter illustrated in FIGS. 1 to 9.
Figure 21:
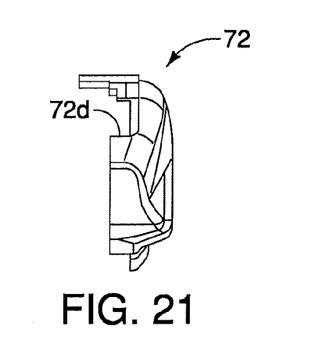
FIG. 21 is an inside elevational view of the second lever body part of the first shift operating member illustrated in FIGS. 19 and 20 for the right bar end shifter illustrated in FIGS. 1 to 9.
Figure 22:
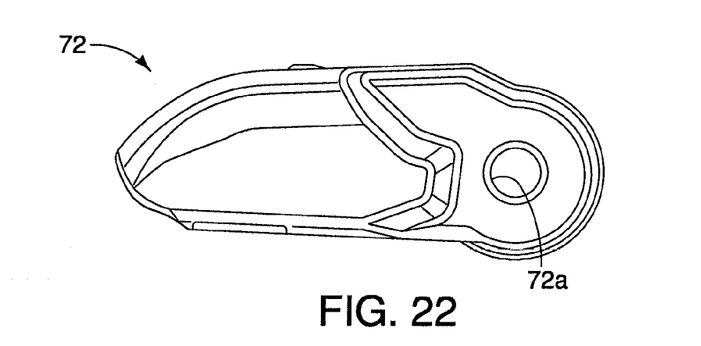
FIG. 22 is a front end elevational view of the second lever body part of the first shift operating member illustrated in FIGS. 19 to 21 for the right bar end shifter illustrated in FIGS. 1 to 9.
Figure 23:
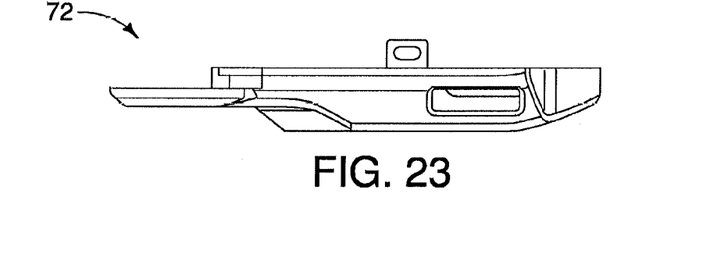
FIG. 23 is a bottom plan view of the second lever body part of the first shift operating member illustrated in FIGS. 19 to 22 for the right bar end shifter illustrated in FIGS. 1 to 9.
Figure 24:
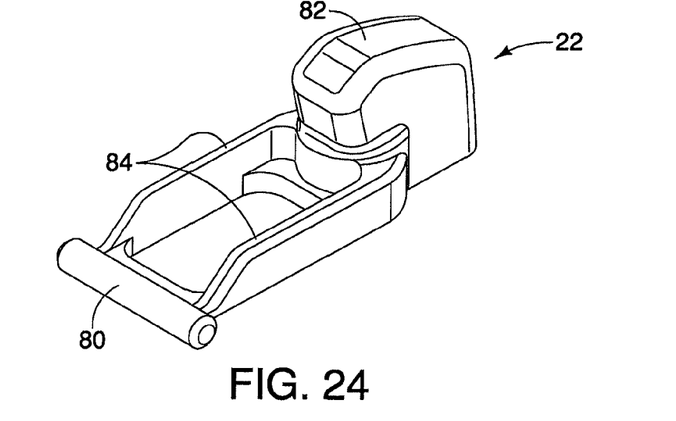
FIG. 24 is a perspective view of the second shift operating member for the right bar end shifter illustrated in FIGS. 1 to 9.
Figure 25:
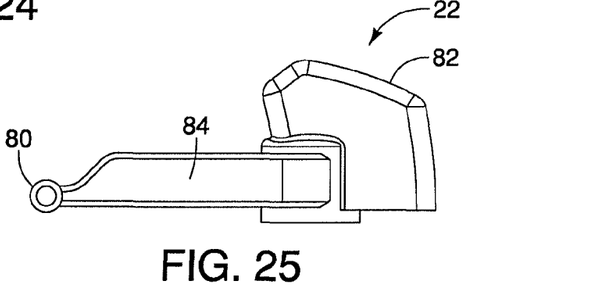
FIG. 25 is a side elevational view of the second shift operating member illustrated in FIG. 24 for the right bar end shifter illustrated in FIGS. 1 to 9.
Figure 26:
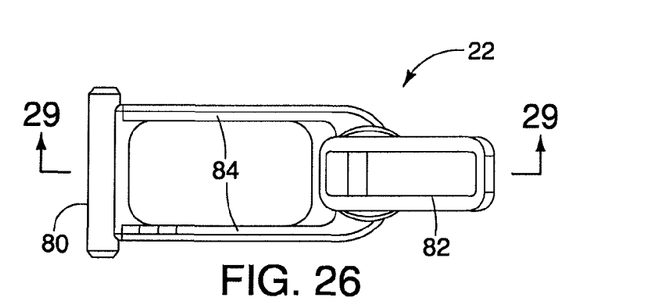
FIG. 26 is a top plan view of the second shift operating member illustrated in FIGS. 24 and 25 for the right bar end shifter illustrated in FIGS. 1 to 9.
Figure 27:
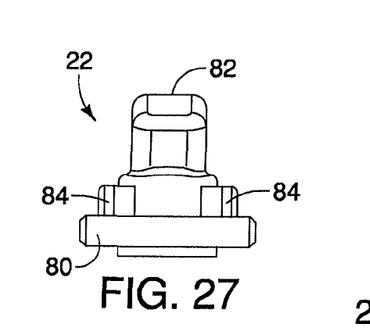
FIG. 27 is a rear end elevational view of the second shift operating member illustrated in FIGS. 24 to 26 for the right bar end shifter illustrated in FIGS. 1 to 9.
Figure 28:
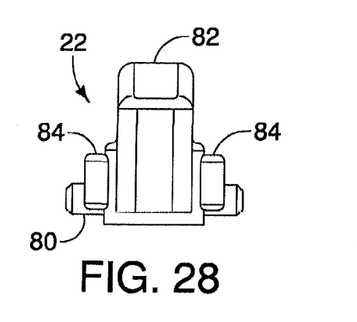
FIG. 28 is a front end elevational view of the second shift operating member illustrated in FIGS. 24 to 27 for the right bar end shifter illustrated in FIGS. 1 to 9.
Figure 29:
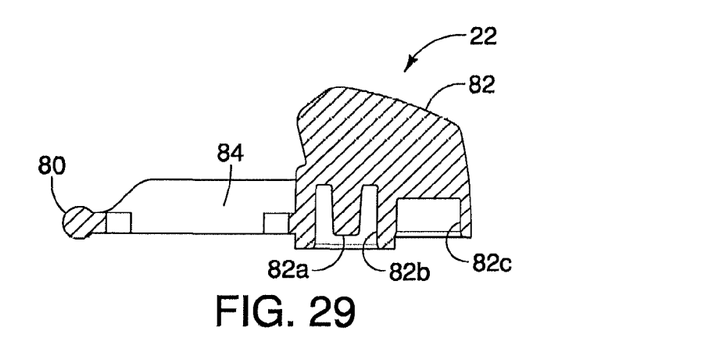
FIG. 29 is a cross-sectional view of the second shift operating member illustrated in FIGS. 24 to 28 as seen along section line 29-29 of FIG. 28.
Figure 30:
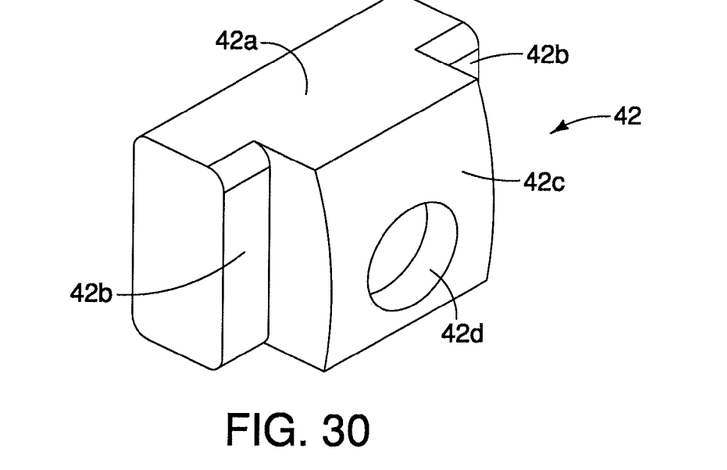
FIG. 30 is a perspective view of the friction member for the right bar end shifter illustrated in FIGS. 1 to 9.
Figure 31:
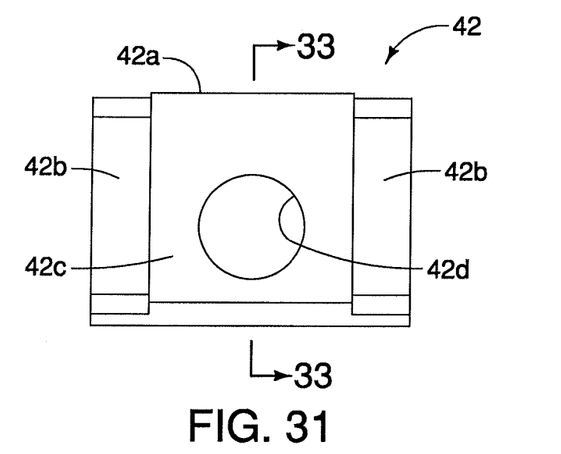
FIG. 31 is a side elevational view of the friction member illustrated in FIG. 30 for the right bar end shifter illustrated in FIGS. 1 to 9.
Figure 32:
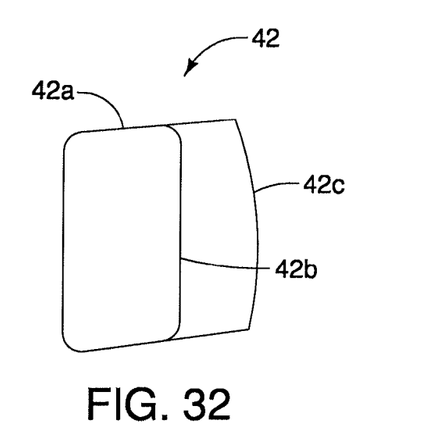
FIG. 32 is a rear elevational view of the friction member illustrated in FIGS. 30 and 31 for the right bar end shifter illustrated in FIGS. 1 to 9.
Figure 33:
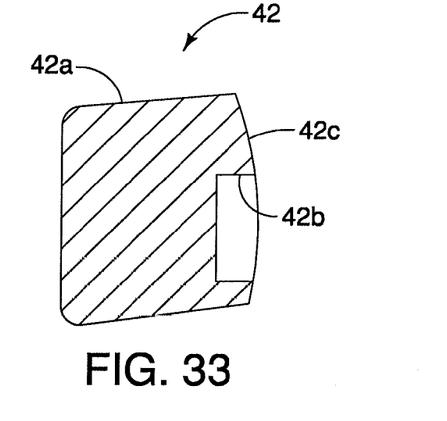
FIG. 33 is a cross-sectional view of the second shift operating member illustrated in FIGS. 30 to 32 as seen along section line 33-33 of FIG. 32.

As best seen in FIGS. 5 to 9, the shift operation indicating mechanism 40 preferably includes a friction member 42 and a detent 44. The shift operation indicating mechanism increases a load on the first shift operating member 21 when the first shift operating member 21 is move in the first shift direction D1 from the rest position (FIG. 5) of the first shift operating member 21 to the shift position (FIG. 6) of the first shift operating member 21. As best seen in FIGS. 30 to 33, the friction member 42 has a center part 42*a* with a pair of mounting flange parts 42*b* extending laterally from the center part 42*a*. The center part 42*a* has a curved engagement surface 42*c* with a recess 42*d*. The recess 42*d* receives the detent 44 when the first shift operating member 21 is in the rest position (FIG. 5). When the first shift operating member 21 has been pivoted from the rest position (FIG. 5) to the shift position (FIG. 6), the detent 44 engages the curved engagement surface 42*c*. The mounting flange parts 42*b* of the friction member 42 is attached to the first shift operating member 21 by the mounting flange parts 42*b*, while the detent 44 is attached to the base member 20. In the illustrated embodiment, the detent 44 is a bolt that is threaded into a hole 48 in the base member 20. As best seen in FIG. 8, the detent 44 has a free tip end with a hemisphere 44*a*. The hemisphere 44*a* is engaged with the recess 42*d* when the first shift operating member 21 is in the rest position (FIG. 5). The hemisphere 44*a* engages the curved engagement surface 42*c* when the first shift operating member 21 is in the shift position (FIG. 6). Since the friction member 42 is attached to the first shift operating member 21, the recess 42*d* is effectively disposed on the first shift operating member 21. Also since the detent 44 is attached to the base member 20, the hemisphere 44*a* is effectively disposed on the base member 20. Alternatively, the recess 42*d* is effectively disposed on the base member 20, and the hemisphere 44*a* is effectively disposed on the first shift operating member 21. In other words, the arrangement of the friction member 42 and the detent 44 can be reversed, if needed and/or desired.

As best seen in FIGS. 10 to 13, the base member 20 is a one-piece, unitary bracket member that is constructed of a hard, rigid material such as a hard, rigid plastic material. The base member 20 includes a handlebar mounting portion 50, an abutment portion 52, a pivot portion 54 and an actuation portion 56. As mentioned above, the base member 20 pivotally supports the first shift operating member 21, which in turn supports the second shift operating member 22 and the electrical shift control unit 26. As seen in FIGS. 5 to 7, the electrical cord 28 of the electrical shift control unit 26 extends from the actuation portion 56, through a passageway 58 formed in the portions 50, 52 and 54, and into the interior of the aero bar 14.

The handlebar mounting portion 50 of the base member 20 is configured to be fixedly mounted one of the aero bars 14 such that the bar end shifters 16 is cantilevered with respect to the free end of the aero bar 14. In particular, the handlebar mounting portion 50 is dimensioned to fit inside the free end of the aero bar 14. In this embodiment, the handlebar mounting portion 50 is an elliptical column that fits into an elliptical interior of the free end of the aero bar 14. Of course, it will be apparent from this disclosure that the shape of the handlebar mounting portion 50 depends on the shape of the free end of the aero bar 14. A handlebar attachment bolt 60 is used to fix the base member 20 to the free end of the aero bar 14. The handlebar attachment bolt 60 extends through an opening 14a and is threaded into one of a plurality (three) of threaded holes 50a in the handlebar mounting portion 50.

The abutment portion 52 of the base member 20 has a larger cross sectional dimension than the handlebar mounting portion 50 so as to abut against the free end of the aero bar 14 when the handlebar mounting portion 50 is fitted inside the free end of the aero bar 14. The abutment portion 52 of the base member 20 also has a radially extending hole 52a that threadedly receives a stop bolt 62.

The pivot portion 54 of the base member 20 is provided with a pivot hole 54a and an opening 54b. The pivot hole 54a receives the pivot pin 24 therethrough for pivotally supporting the first shift operating member 21 to the pivot portion 54 of the base member 20. The opening 54b receives the center part 42a of the friction member 42. The opening 54b is dimensioned so that the center part 42a of the friction member 42 can move in a vertical plane as the first shift operating member 21 is pivoted from the rest position (FIG. 5) to the shift position (FIG. 6).

The actuation portion 56 of the base member 20 is provided with a first projection 56a, a first tubular portion 56b and an additional tubular portion 56c. The first tubular portion 56b encircles the first projection 56a. The additional tubular portion 56c is located closer to the first pivot axis A1 than the first tubular portion 56b. The first tubular portion 56b receives a first coil buffer spring 64, while the additional tubular portion 56c receives a first coil return spring 66.

The first coil buffer spring 64 is provided between the actuation portion 56 of the base member 20 and the electrical signal unit 26 to smoothly operate the first electrical switch 31 when the first shift operating member 21 is moved in the first shift operating direction D1. The first coil buffer spring 64 constitutes a first operating portion of the base member 20. In particular, a first end of the first coil buffer spring 64 contacts a base of the first button 31a with a center projection of the first button 31a disposed in the center of the first coil buffer spring 64, while a second end of the first coil buffer spring 64 is disposed in the first tubular portion 56b with the first projection 56a disposed in the center of the first coil buffer spring 64. As the first shift operating member 21 is moved in the first shift operating direction D1 to perform a shifting operation, the first coil buffer spring 64 is compressed. This compression of the first coil buffer spring 64 depresses the base of the first button 31a of the first electrical switch 31 to operate (close) the first electrical switch 31 for outputting a shift signal. In other words, when the spring force of the first coil buffer spring 64 exceeds a prescribed force, the internal spring of the first electrical switch 31 is compressed so that the first button 31a of the first electrical switch 31 is depressed to close the internal contacts of the first electrical switch 31.

The first coil return spring 66 is provided between the actuation portion 56 of the base member 20 and the electrical signal unit 26 to bias the first shift operating member 21 with respect to the base member 20 about the first pivot axis A1 in an opposite direction to the first shift operating direction D1. Preferably, the first coil return spring 66 has a higher biasing force than the first coil buffer spring 64.

As seen in FIGS. 8, 9 and 14 to 23, the first shift operating member 21 basically includes a first lever body part 70 and a second lever body part 72. The first and second lever body parts 70 and 72 are preferably coupled together by a snap-fit arrangement to form a hollow interior for housing the second shift operating member 22 and the electrical shift control unit 26. The forward end of the first shift operating member 21 is decreases in overall cross section as it approaches the free end for reducing air resistance. The first shift operating member 21 houses the second shift operating member 22 and the electrical shift control unit 26. The first and second lever body parts 70 and 72 are preferably formed of a hard rigid plastic material.

As seen in FIGS. 14 to 18, the first lever body part 70 is a one-piece, unitary member that has a first pivot hole 70a, a first mounting recess 70b, a first pivot bore 70c and a first cutout 70d. One end of the pivot pin 24 is received in the first pivot hole 70a to pivotally support the first lever body part 70. One of the mounting flange parts 42b of the friction member 42 is received in the first mounting recess 70b to fixedly support the friction member 42 on the first lever body part 70 so that the friction member 42 moves with the first lever body part 70 with respect to the base member 20. The first pivot bore 70c is a blind bore that pivotally supports the second shift operating member 22 on the first lever body part 70. The first cutout 70d forms a first part of an opening for the second shift operating member 22 such that the second shift operating member 22 partially projects out of the top surface of the first shift operating member 21.

As seen in FIGS. 19 to 23, the second lever body part 72 is a one-piece, unitary member that has a second pivot hole 72a, a second mounting recess 72b, a second pivot bore 72c and a second cutout 72d. One end of the pivot pin 24 is received in the second pivot hole 72a to pivotally support the second lever body part 72. One of the mounting flange parts 42b of the friction member 42 is received in the second mounting recess 72b to fixedly support the friction member 42 on the second lever body part 72 so that the friction member 42 moves with the second lever body part 72 with respect to the base member 20. The second pivot bore 72c is a blind bore that pivotally supports the second shift operating member 22 on the second lever body part 72. The second cutout 72d forms a second part of an opening for the second shift operating member 22 such that the second shift operating member 22 partially projects out of the top surface of the first shift operating member 21.

As seen in FIGS. 24 to 29, the second shift operating member 22 basically includes a pivot part 80, a rider operating part 82 and a pair of connecting parts 84. The pivot part 80 and the rider operating part 82 are connected together by the connecting parts 84. Preferably, the parts 80, 82 and 84 are integrally formed as a one-piece, unitary member (single unit) that constructed from a hard rigid plastic material. The pivot part 80 has opposite ends pivotally supported in the first and second pivot bores 70c and 72c of the first and second lever body parts 70 and 72. Thus, the second shift operating member 22 is pivotally supported on the first shift operating member 21.

As best seen in FIGS. 5 to 7 and 29, the rider operating part 82 of the second shift operating member 22 is provided with a second projection 82a, a second tubular portion 82b and an additional tubular portion 82c. The second tubular portion 82b encircles the second projection 82a. The additional tubular portion 82c is located farther to the second pivot axis A2 than the second projection 82a. The second tubular portion 82b receives a second coil buffer spring 84, while the additional tubular portion 82c receives a second coil return spring 86.

The second coil buffer spring 84 is provided between the rider operating part 82 of the second shift operating member 22 and the electrical signal unit 26 to smoothly operate the second electrical switch 32 when the second shift operating member 22 is moved in the second shift operating direction D2. The second coil buffer spring 84 constitutes a second operating portion of the base member 20. In particular, a first end of the second coil buffer spring 84 contacts a base of the second button 32a with a center projection of the second button 32a disposed in the center of the second coil buffer spring 84, while a second end of the second coil buffer spring 84 is disposed in the second tubular portion 82b with the second projection 82a disposed in the center of the second coil buffer spring 84. As the second shift operating member 22 is moved in the second shift operating direction D2 to perform a shifting operation, the second coil buffer spring 84 is compressed. This compression of the second coil buffer spring 84 depresses the base of the second button 32a of the second electrical switch 32 to operate (close) the second electrical switch 32 for outputting a shift signal. In other words, when the spring force of the second coil buffer spring 84 exceeds a prescribed force, the internal spring of the second electrical switch 32 is compressed so that the second button 32a of the second electrical switch 32 is depressed to close the internal contacts of the second electrical switch 32.

The second coil return spring 86 is provided between the rider operating part 82 of the second shift operating member 22 and the electrical signal unit 26 to bias the second shift operating member 22 with respect to the base member 20 about the second pivot axis A2 in an opposite direction to the second shift operating direction D2. Preferably, the second coil return spring 86 has a higher biasing force than the second coil buffer spring 84.

When the first shift operating member 21 is moved in the first shift operating direction D1 to perform a shifting operation, the coil springs 64 and 66 are compressed. Thus, effectively the first electrical switch 31 is operated (closed). When the first shift operating member 21 is moved in the first shift operating direction D1 to perform a shifting operation, only the shift signal of the first electrical switch 31 will be output to the derailleur. When the first operating member 21 is moved in direction D1, only the first electrical switch 31 is operated (depressed) and the second electrical switch 32 is not depressed. When the first operating member 21 is moved in the first shift operating direction D1, the second shift operating member 22 is moved in same direction, because the second coil return spring 86 pushes the second shift operating member 22 in the first shift operating direction D1. While the first electrical switch 31 is illustrated as a normally open switch, it will be apparent from this disclosure that it can be a normally closed switch.

On the other hand, the second shift operating member 22 is moved in the second shift operating direction D2 to perform a shifting operation, the coil springs 84 and 86 are compressed. Thus, effectively the second electrical switch 32 is operated (closed). When the second shift operating member 22 is moved in the second shift operating direction D2 to perform a shifting operation, only the shift signal of the second electrical switch 32 will be output to the derailleur. While the second electrical switch 32 is illustrated as a normally open switch, it will be apparent from this disclosure that it can be a normally closed switch.

Figure 34:
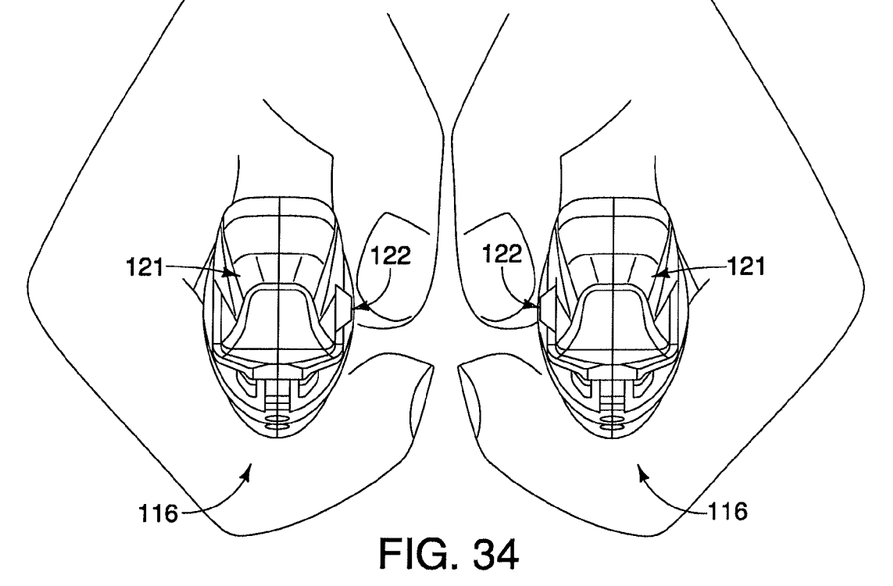
FIG. 34 is a front elevational view of a pair of bar end shifters in accordance with a second embodiment, with a rider gripping the aero bars.
Figure 35:
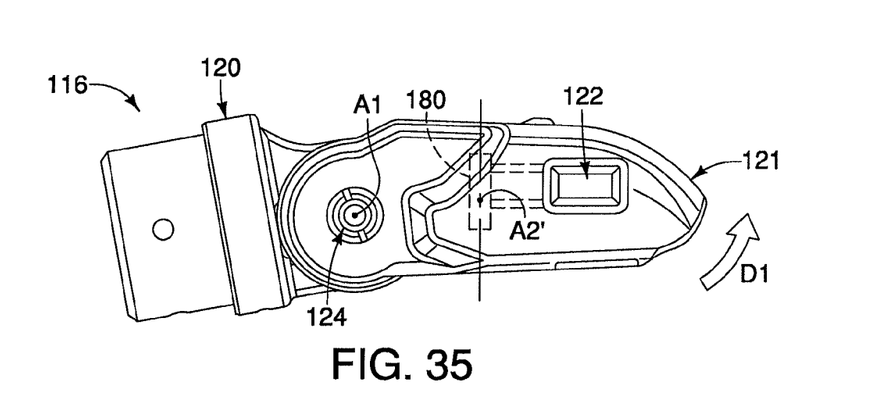
FIG. 35 is a side elevational view of the right bar end shifter illustrated in FIG. 34, prior to attachment to the free end of the right side aero bar.
Figure 36:
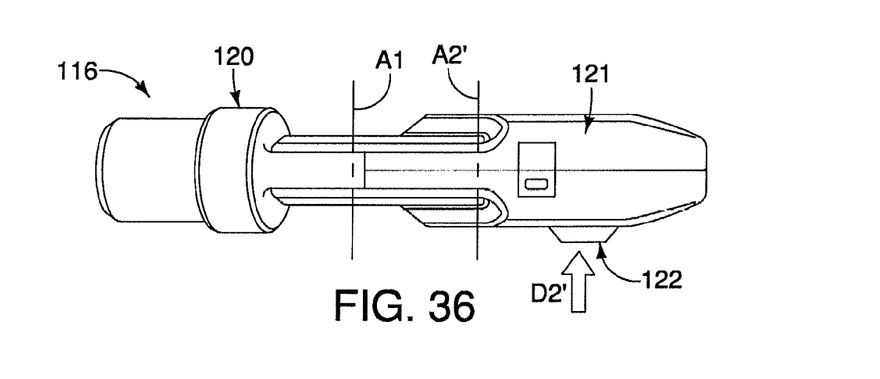
FIG. 36 is a top plan view of the right bar end shifter illustrated in FIGS. 34 and 35, prior to attachment to the free end of the right side aero bar.

Referring now to FIGS. 34 to 36, bar end shifters 116 in accordance with a second embodiment will now be discussed.

Basically, the bar end shifter 116 includes a base member 120, a first shift operating member 121 and a second shift operating member 122. In this embodiment, the first shift operating member 121 is pivotally mounted on the first pivot axis A1 (same as first embodiment) to move in the first shift operating direction D1, but the second shift operating member 122 is pivotally mounted on a second pivot axis A2' that is perpendicular or substantially perpendicular (i.e., within five degrees of perpendicular) to the first pivot axis A1. The first shift operating member 121 operates in the same manner as the first shift operating member 21 of the first embodiment. The second shift operating member 122 has a vertically extending pivot part or pin 180 that is mounted onto one of the body parts of the first shift operating member 121 to operate in a second shift operating direction D2' to perform a shifting operation. The second shift operating direction D2' of the second shift operating member 122 is substantially orthogonal (i.e., within five degrees of perpendicular) to the first shift operating direction D1. Other than the direction of movement of the second shift operating member 122, the second shift operating member 122 operates in the same manner as the second shift operating member 22 of the first embodiment. Accordingly, an electrical shift control unit (not shown) is provided on the first shift operating member 121. Like the first embodiment, the electrical shift control unit of this embodiment includes an electrical switch housing, first and second electrical switches and a single circuit board. The first electrical switch is the same as the first embodiment, but the second electrical switch is perpendicularly oriented relative to the first electrical switch. In view of the similarities between the first and second embodiments, this embodiment will not be discussed and or illustrated in detail.

GENERAL INTERPRETATION OF TERMS

As used herein to describe the electrical bicycle shift control device, the following directional terms "forward, rearward, above, downward, vertical, horizontal, below and transverse" as well as any other similar directional terms refer to those directions of a bicycle equipped with the electrical bicycle shift control device. Accordingly, these terms, as utilized to describe the shifter should be interpreted relative to a bicycle equipped with the electrical bicycle shift control device. Also in understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, while the above structures are especially useful as bar end shifters for aero bars and/or bull horn handlebars, it will be apparent to those skilled in the art from this disclosure that the above structures can be adapted to other types of shifters that are mounted to the handlebar at an area other than the bar end. Moreover, for example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electrical bicycle shift control device comprising:
   a base member including a handlebar mounting portion that is configured to be fixedly mounted to a free end of a bicycle handlebar;
   a first shift operating member pivotally coupled to the base member from a rest position to a shift position in a first shift operating direction;
   first and second electrical switches disposed on the first shift operating member, the first shift operating member operating the first electrical switch upon movement of the first shift operating member from the rest position to the shift position in the first shift operating direction; and
   a second shift operating member mounted on the first shift operating member to move with the first shift operating member with respect to the base member, and the second shift operating member being independently movable relative to the first shift operating member from a rest position to a shift position in a second shift operating direction that is different from the first shift operating direction, the second shift operating member operating the second electrical switch upon movement of the second shift operating member from the rest position to the shift position in the second shift operating direction.

2. The electrical bicycle shift control device according to claim wherein
   the second shift operating direction of the second shift operating member is either substantially opposite to the first shift operating direction or substantially orthogonal to the first shift operating direction.

3. The electrical bicycle shift control device according to claim 1, wherein
   the first shift operating member pivots on a first pivot axis, and the second shift operating member pivots on a second pivot axis, that is different from the first pivot axis.

4. The electrical bicycle shift control device according to claim 3, wherein
   the first and second pivot axes are substantially parallel to each other.

5. An electrical bicycle shift control device accordingly to claim 1, comprising:
   the second shift operating direction of the second shift operating member being substantially opposite to the first shift operating direction of the first shift operating member.

6. The electrical bicycle shift control device according to claim 1, wherein
   the base member has a first operating portion via which the first shift operating member operates the first electrical switch when the first shift operating member is moved in the first shift operating direction, and the second shift operating member has a second operating portion via which the second shift operating member operates the second electrical switch when the second shift operating member is moved in the second shift operating direction.

7. The electrical bicycle shift control device according to claim 6, wherein
   the first operating portion includes a first coil spring having a first end of the first coil spring operating the first electrical switch, and
   the second operating portion includes a second coil spring having a first end of the second coil spring operating the second electrical switch.

8. The electrical bicycle shift control device according to claim 7, wherein
   the base member has a first tabular portion with a second end of the first coil spring disposed in the first tubular portion, and
   the second shift operating member has a second tubular portion with a second end of the second coil spring disposed in the second tubular portion.

9. The electrical bicycle shift control device according to claim 1, further comprising
   a first return spring having a first end contacting the base member and a second end contacting the first shift operating member, and
   a second return spring having a first end contacting the first shift operating member and a second end contacting the second shift operating member.

10. The electrical bicycle shift control device according to claim 1, further comprising
    a shift operation indicating mechanism which increases a load on the first shift operating member when the first shift operating member is moved in the first direction from the rest position of the first shift operating member to the shift position of the first shift operating member.

11. The electrical bicycle shift control device according to claim 1, wherein
    the first shift operating member extends in an elongated direction from the free end of the handlebar while the handlebar mounting portion is mounted on the free end of the handlebar in an installed position.

12. An electrical bicycle shift control device comprising:
    a base member including a handlebar mounting portion that is configured to be fixedly mounted to a free end of a bicycle handlebar;
    a first shift operating member pivotally coupled to the base member from a rest position to a shift position in a first shift operating direction;
    first and second electrical switches disposed on the first shift operating member, the first and second electrical switches being on a single circuit board disposed on the first shift operating member; and
    a second shift operating member mounted on the first shift operating member to move with the first shift operating member with respect to the base member, and the second shift operating member being independently movable relative to the first shift operating member from a rest position to a shift position in a second shift operating direction that is different from the first shift operating direction.

13. An electrical bicycle shift control device comprising:
    a base member including a handlebar mounting portion that is configured to be fixedly mounted to a free end of a bicycle handlebar;

a first shift operating member pivotally coupled to the base member from a rest position to a shift position a first shift operating direction;

a second shift operating member mounted on the first shift operating member to move with the first shift operating member with respect to the base member, and the second shift operating member being independently movable relative to the first shift operating member from a rest position to a shift position in a second shift operating direction that is different from the first shift operating direction; and a shift operation indicating mechanism which increases a load on the first shift operating member when the first shift operating member is moved in the first direction from the rest position of the first shift operating member to the shift position of the first shift operating member, the shift operation indicating mechanism including one of a recess and a hemisphere disposed on the base member and the other of the recess and the hemisphere disposed on the first shift operating member.

14. An electrical bicycle shift control device comprising:

a base member including a handlebar mounting portion that is configured to be fixedly mounted on a free end of a handlebar and extend in an elongated direction while the handlebar mounting portion is mounted on the free end of the handlebar in an installed position;

a first shift operating member pivotally coupled to the base member;

first and second electrical switches disposed on the first shift operating member, the first shift operating member operating the first electrical switch upon pivotal movement of the first shift operating member relative to the base member; and a second shift operating member mounted on the first shift operating member and independently movable relative to the first shift operating member, the second shift operating member operating the second electrical switch upon movement of the second shift operating member relative to the first shift operating member.

* * * * *